(12) United States Patent
Browne et al.

(10) Patent No.: US 10,102,113 B2
(45) Date of Patent: Oct. 16, 2018

(54) SOFTWARE TEST AUTOMATION SYSTEMS AND METHODS

(71) Applicant: International Business Machines Corporation, Armonk, NY (US)

(72) Inventors: Michael E. Browne, Staatsburg, NY (US); Nnaemeka I. Emejulu, Austin, TX (US); Andrew J. Lavery, Austin, TX (US); Ye Liu, Belmont, MA (US); Mario A. Maldari, Longmont, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 15/180,898

(22) Filed: Jun. 13, 2016

(65) Prior Publication Data

US 2016/0299837 A1    Oct. 13, 2016

Related U.S. Application Data

(63) Continuation of application No. 13/420,923, filed on Mar. 15, 2012, now Pat. No. 9,448,916, which is a (Continued)

(51) Int. Cl.
G06F 11/36    (2006.01)

(52) U.S. Cl.
CPC ...... *G06F 11/3692* (2013.01); *G06F 11/3604* (2013.01); *G06F 11/3676* (2013.01)

(58) Field of Classification Search
CPC ............ G06F 11/3676; G06F 11/3692; G06F 11/3604
(Continued)

(56) References Cited

U.S. PATENT DOCUMENTS

| 5,050,168 A | 9/1991 | Paterson |
| 6,408,430 B2 | 6/2002 | Gunter et al. |

(Continued)

FOREIGN PATENT DOCUMENTS

| EP | 1019818 | 7/2000 |
| JP | 60200346 | 10/1985 |
| JP | 63-276141 | 11/1988 |

OTHER PUBLICATIONS

Misurda, J., et al.; "Demand-Driven Structural Testing with Dynamic Instrumentation"; Int'l Conference on Software Engineering; IEEE; 2005; 10 pages.

(Continued)

*Primary Examiner* — John Chavis
(74) *Attorney, Agent, or Firm* — Schmeiser, Olsen & Watts LLP

(57) ABSTRACT

Described are a system and method for performing an automated quality assessment on a software program under test. A test automation system executes a test on a software program Data related to the test is automatically collected. The data includes first information determined by the test automation system in response to executing the test. The data further includes second information related to the test and received from a source other than the test automation system. The first information is analyzed. A quality assessment of the software program is generated from the analyzed first information and from the second information.

15 Claims, 5 Drawing Sheets

Related U.S. Application Data continuation of application No. 13/187,950, filed on Jul. 21, 2011, now Pat. No. 9,396,094.

(58) Field of Classification Search
USPC .......................................................... 717/131
See application file for complete search history.

(56) References Cited

U.S. PATENT DOCUMENTS

| | | | |
|---|---|---|---|
| 6,725,399 B1 | 4/2004 | Bowman | |
| 6,779,134 B1 | 8/2004 | Laviolette et al. | |
| 7,284,194 B2 | 10/2007 | Gupta | |
| 7,337,431 B1 | 2/2008 | Barnes | |
| 7,412,349 B2* | 8/2008 | Moser | G06F 11/3688 |
| | | | 702/182 |
| 7,552,361 B2 | 6/2009 | Galler et al. | |
| 7,603,660 B2 | 10/2009 | Davia et al. | |
| 2003/0005413 A1* | 1/2003 | Beer | G06F 11/3664 |
| | | | 717/125 |
| 2003/0051188 A1 | 3/2003 | Patil | |
| 2003/0093716 A1 | 5/2003 | Farchi | |
| 2003/0229889 A1 | 12/2003 | Kuzmin | |
| 2004/0073662 A1 | 4/2004 | Falkenthros | |
| 2004/0143819 A1 | 7/2004 | Cheng | |
| 2004/0153822 A1 | 8/2004 | Arcand et al. | |
| 2004/0243334 A1 | 12/2004 | Wrigley et al. | |
| 2005/0081104 A1 | 4/2005 | Nikolik | |
| 2005/0223361 A1 | 10/2005 | Belbute | |
| 2005/0229043 A1 | 10/2005 | Nasuti | |
| 2005/0229162 A1* | 10/2005 | Tanner, Jr. | G06F 11/3696 |
| | | | 717/126 |
| 2006/0025985 A1 | 2/2006 | Vinberg et al. | |
| 2007/0006037 A1 | 1/2007 | Sargusingh | |
| 2007/0136024 A1* | 6/2007 | Moser | G06F 11/3688 |
| | | | 702/119 |
| 2007/0168970 A1 | 7/2007 | Li et al. | |
| 2009/0007074 A1 | 1/2009 | Campion et al. | |
| 2009/0319830 A1* | 12/2009 | Zander-Nowicka | G01B 31/31834 |
| | | | 714/32 |
| 2010/0251027 A1 | 9/2010 | Yawalkar et al. | |

OTHER PUBLICATIONS

Non-Final Office Action in related U.S. Appl. No. 13/420,923, dated Jun. 28, 2013; 33 pages.
Final Office Action in related U.S. Appl. No. 13/420,923, dated Jan. 16, 2014; 36 pages.
Non-Final Office Action in related U.S. Appl. No. 13/420,923, dated Oct. 6, 2014; 35 pages.
Final Office Action in related U.S. Appl. No. 13/420,923, dated Mar. 11, 2015; 35 pages.
Non-Final Office Action in related U.S. Appl. No. 13/420,923, dated Sep. 24, 2015; 33 pages.
Non-Final Office Action in related U.S. Appl. No. 13/187,950, dated Mar. 25, 2013; 15 pages.
Final Office Action in related U.S. Appl. No. 13/187,950, dated Jul. 18, 2013; 20 pages.
Non-Final Office Action in related U.S. Appl. No. 13/187,950, dated Jun. 17, 2014; 23 pages.
Final Office Action in related U.S. Appl. No. 13/187,950, dated Jan. 12, 2015; 32 pages.
Shittu, Hakeem, "WinRunner in Simple Steps", 2007, genixpress. com; pp. 150-151.
Non-Final Office Action in related U.S. Appl. No. 13/187,950, dated Jul. 2, 2015; 29 pages.
Final Office Action in related U.S. Appl. No. 13/187,950, dated Oct. 21, 2015; 26 pages.
Aotice of Allowance and Fee(s) Due in related U.S. Appl. No. 13/187,950, dated Apr. 13, 2016; 20 pages.
Notice of Allowance and Fee(s) Due in related U.S. Appl. No. 13/420,923, dated Jun. 1, 2016; 23 pages.

* cited by examiner

SOFTWARE TEST AUTOMATION SYSTEMS AND METHODS

RELATED APPLICATIONS

This application is a continuation application claiming the benefit of the filing date of U.S. patent application Ser. No. 13/187,950, filed Jul. 21, 2011, entitled "Software Test Automation Systems and Methods," and U.S. patent application Ser. No. 13/420,923, filed Mar. 15, 2012, entitled "Software Test Automation Systems and Methods," contents of each of which are incorporated by reference herein in their entirety.

FIELD OF THE INVENTION

The present invention relates generally to software test automation, and more specifically to test automation systems and methods for performing an automatic software quality assessment.

BACKGROUND

Test automation tools are readily available for software developers, quality assurance (QA) engineers, and/or test engineers to test a software application or other software program. When a software program fails a test, the test engineer will generally attempt to determine whether the software program has a defect. In doing so, the test engineer will first attempt to determine whether the test failure is a false positive, for example, whether a network failure or other extraneous event occurred during the test which may have provided a false reading, or whether the test failure is the result of an actual defect in the software program under test. If a defect is discovered, the test engineer will typically perform a set of laborious manual steps to determine the circumstances occurring during the test, for example, what the test was doing, what part of the code was being exercised when the failure occurred, and whether there is a history of similar test failures.

BRIEF SUMMARY

In one aspect, a computer-implemented method is provided for performing an automated quality assessment on a software program under test. The method comprises executing by a test automation system a test on a software program. Data related to the test is automatically collected. The data includes first information determined by the test automation system in response to executing the test. The data further includes second information related to the test and received from a source other than the test automation system. The first information is analyzed. A quality assessment of the software program is generated from the analyzed first information and from the second information.

In another aspect, a computer-implemented method is provided for performing an automated quality assessment on a software program under test. The method comprises executing a test on a body of software code using a test automation tool. Information associated with the test is dynamically determined from a source other than the test automation tool. The information includes data indicating whether the test covers at least a first component of the body of software code. A first record of the test is generated. The first record includes an identifier corresponding to the first component and at least one result of the test related to the first component.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
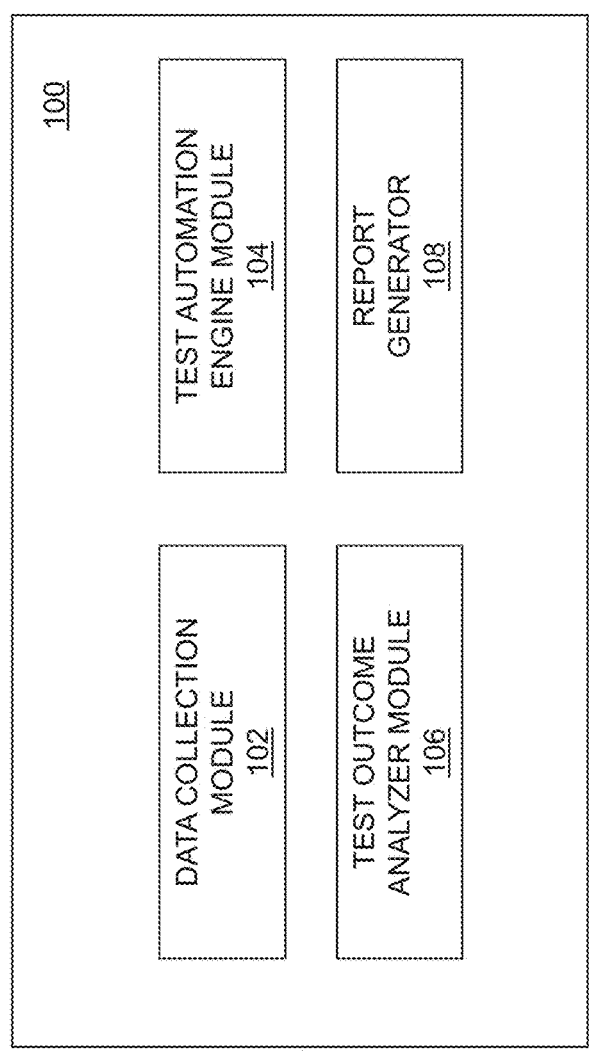
FIG. 1 is a block diagram of a test automation system, in accordance with an embodiment.

In the following description, specific details are set forth although it should be appreciated by one of ordinary skill that the systems and methods can be practiced without at least some of the details. In some instances, known features or processes are not described in detail so as not to obscure the present invention.

In brief overview, aspects of the present inventive concepts include software test automation systems and methods that automatically retrieve information related to a test performed on a software program and that use this information to produce a quality assessment of the software program. Information can be derived from an analysis of test characteristics, such as the type of test performed on the software program, configuration details such as hardware platform type, operating systems, and the like, code paths exercised by the test, and other information details that can be observed by the test automation system performing the test. Information can also be retrieved from other sources external to the test automation system. One such source can include a quality management tool such as the Rational Quality Manager (RQM) by International Business Machines Corporation. Another source of information can include a database or other repository that stores historical data related to the test. For example, a listing of previous test results can be provided for establishing performance trends. Other sources can provide context-related information that can be used in the quality assessment of the software program, for example, information related to other tests being performed or other test or software-related contexts.

For example, the test automation system can receive from a source, for example, a test tool in communication with the test automation system, information such as a test title, test description, and/or other test information. The description can be in the form of keywords indicating the type of test to be performed. The keywords can be retrieved from a test tracking system, e.g., RQM, or other information source. The test automation system can also link elements of the test environment to the requirements or features corresponding to the software program under test, or "stories" used in connection with agile development methodologies. The test automation system can also monitor a test under way to determine information about the test environment. For example, the test automation system can determine an amount of http traffic that is generated when a performance or scalability test is performed, or monitor that the test is repeatedly inputting different input values in a field of a web page under test to test the boundary conditions of the web page input field.

In an embodiment, the test automation systems and methods can perform a post-execution analysis of test results, for example, by executing an automated test, monitoring what is being tested, and analyzing during post-execution those areas that are problematic and may have experienced a failure. In one example, the test automation system can determine software component success data, for example, whether a software component passes or fails in the test environment. In another example, the test automation system can determine that one test is a stress test that fails when performed on one component of a software program, and distinguish it from another stress test that passes when performed on another component of the software program.

The quality assessment can be provided in the form of a quality assessment report or other format that permits a user to view or otherwise process the analyzed test results, regardless of whether the test results include test pass data or test fail data. Accordingly, a user can identify for a given test problematic areas in a software program, more specifically, areas that do not function well. A user can also receive an assessment on areas that require an improvement in quality, even if the quality assessment indicates that a test passes, for example, indicating that those areas are functionally acceptable.

The quality assessment can be used by the test automation system to open a new defect regarding a test failure based on the test analysis, or annotate an existing defect, for example, using contextual clues that can be observed by the test automation system. For example, the test automation system may notice that boundary cases fail but non-boundary cases pass, or that a test fails under a light load, but fails under a heavy load. This allows the test automation system to open a defect automatically with the appropriate wording and classification. For instance, consider a GUI test that fails under heavy load, but passes under light load. A defect could be opened for this with information such as "GUI test x fails under heavy load," even though it passes under light load. In another example, a test might fail on a certain platform, but pass on others. Here, a defect could be opened with this information, such as "Install test x fails on the HP-Unix operating system, but passes on all other operating systems." Even if no defects are determined, information related to a successful test can be used to provide a confidence factor that those parts of the product are robust.

FIG. 1 is a block diagram of a test automation system 100, in accordance with an embodiment. The test automation system 100 can be configured as part of a server or other computer platform having at least a processor such as a CPU, a memory device, and a network interface that communicate with each other over one or more communications busses, for example, a Peripheral Component Interconnect (PCI) bus. The memory device (not shown) can store program code corresponding to an operating system and/or various elements of the test automation system 100 in accordance with embodiments described herein. The network interface can include one or more connectors known to those of ordinary skill in the art, depending on the network type, e.g., LAN, WAN, wireless, and the like. The test automation system 100 can build upon known technology such as code coverage tools and test management tools, for example, RQM systems, as well as other test tools that run tests, for example, RFT systems.

The test automation system 100 includes a data collection module 102, a test automation engine module 104, a test outcome analyzer module 106, and a report generator 108. Elements of the test automation system 100 can be executed by different processors on the same computer system or on different computer systems. Elements of the test automation system 100 can communicate with each other via one or more communications busses, network connectors, and/or intervening communication devices known to those of ordinary skill in the art.

The data collection module 102 can communicate with one or more information sources that provide information related to a test such as a software component associated with a particular aspect of the test. Information sources can include but are not limited to one or more functional test automation tools, test management tools, quality management tools, code coverage test tools, and the like. For example, the data collection module 102 can communicate with a RQM server, which can manage a test plan, track requirements, test artifacts, and test results for an iterative and incremental development process, for example, an agile software development process. The data collection module 102 can communicate with functional test automation tools, for example, a Rational Function Test (RFT) system, a Rational Performance Test system, a Mercury Loadrunner system, and the like, which can perform scripting and execution of the tests analyzed by the test automation system 100. For example, a test can be executed on a body of software code using a Rational Function Test (RFT) system. RQM can output additional test results to the data collection module 102. For example, RFT and/or RQM can output information related to a test performed on the graphical user interface (GUI) of a software application under test that includes clicking a mouse in a window. Other software tools can be available to communicate with the test automation system 100 to track the requirements of the product, along with the test items that go along with each product requirement.

Another information source can be a data repository that stores historical data related to the test, for example, historical data indicating whether each test run passed or failed, how long each test run took, what parameters were used to run the test, or other data that can be used in a product quality analysis to classify defects, determine performance trends, provide context data, and the like.

The test automation engine module 104 can monitor what is being tested and can automatically determine information about the tests being executed. The test automation engine module 104 can be automated using one or more of the abovementioned test tools in communication with the test automation system 100, for example, Rational Function Tester (RFT), Rational Performance Tester, Mercury Loadrunner, and the like. Accordingly, the tests can be executed from the test automation engine module 104 and/or from a functional test automation tool in communication with the test automation system 100, for example, a RFT server.

The test automation engine module 104 can automatically determine information such as the type of test being executed, for example, a GUI test, a command line interface (CLI) test, an IBM 3270 interface test, a SOAP interface test, and other tests known to those of ordinary skill in the art. In another example, the test automation engine module 104 can determine whether an executed test is a scale test that is performed to determine performance-related results, for example, an optimum or maximum flow of http traffic. In another example, the test automation engine module 104 can determine whether the test is repeatedly exercising an application program interface (API) with varying parameters or exercising boundary conditions. The test automation engine module 104 can perform a runtime discovery of test coverage, and can use existing code coverage techniques to learn what components are exercised by the test.

The test outcome analyzer module 106 can record the information determined by the test automation engine module 104, and can analyze an outcome resulting from one or more test runs. For tests that pass, this information can be used in a trend analysis of the parts of the product that are working well. For tests that fail, this information can be used to open defects and analyze trends related to what parts of the product are not working well. The test outcome analyzer module 106 can use the data received regarding a current test run provided by the test automation engine module 104, and can optionally receive information from the data collection module 102, to analyze the product quality and/or to classify defects. The test outcome analyzer module 106 can analyze each test result, e.g., each test failure or test success, independently. The test outcome analyzer module 106 can analyze the test results for overall trends regarding the quality of a software release by aggregating data for all of the tests run on the product.

The report generator 108 can automatically generate a quality assessment report from the test analysis data generated by the test outcome analyzer module 106 and the information collected by the data collection module 102. The quality assessment report can provide data about what areas of the product are well tested and functioning properly, what areas of the product are well tested and not functioning properly, and what areas of the product have not been tested. This info can be used to predict weak areas of the tested software program under test, and suggest areas that require additional testing. The quality assessment report can be generated as a table, graph, or related format that permits a user to determine information about the test results.

Figure 2:
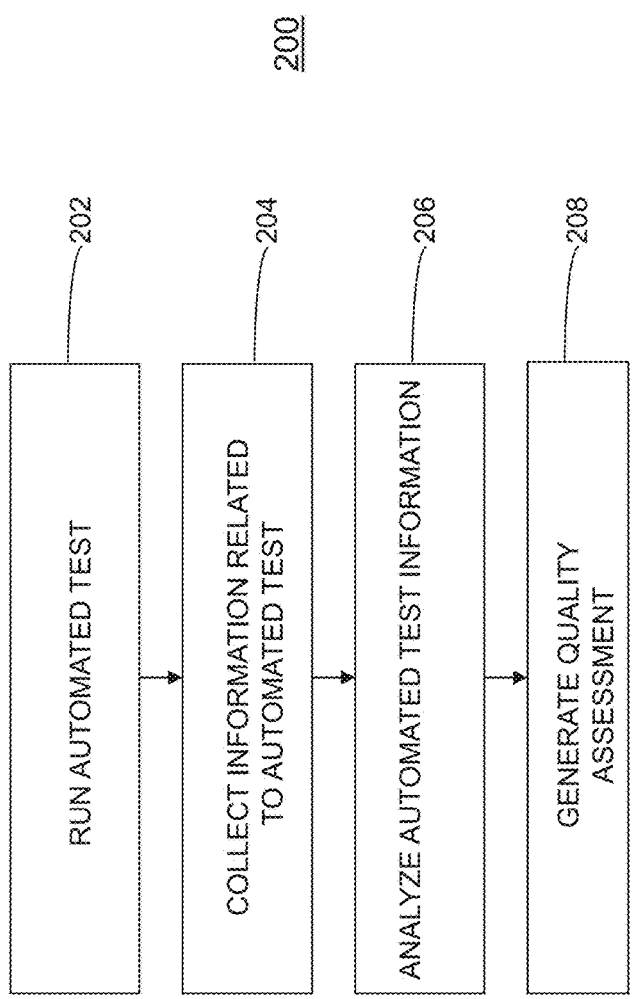
FIG. 2 is a flowchart of a method for performing an automatic software product quality assessment, in accordance with an embodiment.

FIG. 2 is a flowchart of a method 200 for performing an automatic software product quality assessment, in accordance with an embodiment. In describing the method 200, reference is also made to FIG. 1. Some or all of the method 200 can be performed on a computer system comprising at least a processor, a memory, and the test automation system 100. Some or all of the method 200 can make use of, but is not limited to, other test tools, for example, a test management tool, a quality management tool, a code coverage test tool, or other well-known related test automation tools and/or one or more test information repositories such as those referred to herein.

At block 202, at least one automated test can be run against a software program corresponding to a software product to exercise the various requirements and functions of the program. The automated test can be determined in a manner known to those of ordinary skill in the art, for example, by executing the program under test with test inputs by a functional test automation tool, e.g., RFT. The automated test can be run using test scripts and the like.

At block 204, information related to the automated test can be automatically collected. This information can include what type of test has been run. Examples can include but not be limited to a boundary conditions test, a stress test, a test of a GUI, an http protocol test, a SOAP protocol test, a command line interface (CLI) function test. Other collected information can include what the test is exercising, which code paths are being exercised by the test, which platforms are exercised by the test, and other detailed test configuration details obtained by the test automation system 100 during the test run. Other information can include test result data, in particular, whether the executed automated test is successful. Other information related to the automated test can be received from sources external to the automated test system 100 such as an automation test tool, e.g., RQM, or test information repository that stores historical data. For example, the test automation engine module 104, when executing an automated test, can automatically have access to a text description, e.g., title of the test, which can be provided by a test tracking system such as RQM in the form of keywords indicating the type of test to be performed.

At block 206, the collected automated test information, for example, test results, can be analyzed and recorded. For tests that pass, this information along with historical data can be used in a trend analysis to determine areas of the product that are functioning properly. For tests that fail, this information can be used to open defects and analyze trends of what parts of the product are not working well. The test results can be analyzed for overall trends for the program under test by aggregating data for all of the tests run on the product.

At block 208, a quality assessment can be produced from the analysis. The quality assessment can include data about what areas, for example, sections of code, of the program under test that are well tested and functioning properly, areas of the program under test that are well tested and not functioning properly, and areas of the program under test that have not been tested.

Accordingly, the test automation engine 100 can analyze what passes and fails using the information it collects, and produce a quality assessment from this information. The following is a set of examples of quality assessments produced by the test automation engine 100. In one example, a quality assessment can be generated indicating that 80% of GUI tests failed for one component of a program under test, but that 100% of CLI tests passed for another component of the program under test. In another example, the quality assessment can indicate that a set of scale tests of a component of the program under test failed, but all other tests of the same component passed. In another example, the quality assessment can indicate that a particular test failed, but that the same test passed during twenty previous runs. In this same example, the quality assessment can point out that the failed test exercised a source file com.ibm.websphere.engine.DBQueryLayer, which had been modified in the latest build. In another example, the quality assessment can indicate that a component of the program under test has a code coverage of 80% with this test run, and that the success rate of tests exercising this same component is 95%, and that the success rate has increased from 70% to 95% in the past 30 days.

Figure 3:
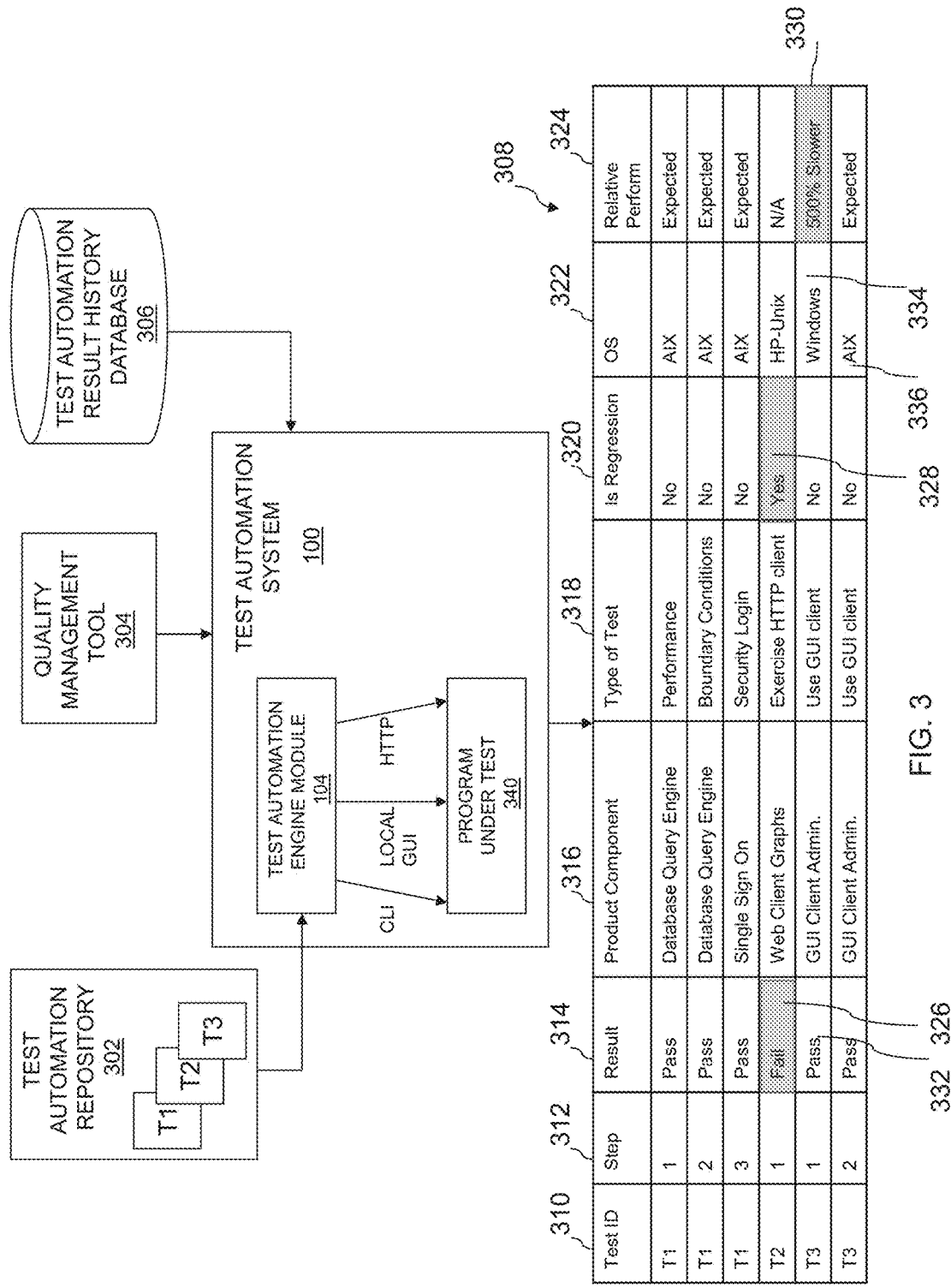
FIG. 3 is a schematic block diagram illustrating a test automation system generating a quality assessment report in response to retrieved test-related data, in accordance with an embodiment.

FIG. 3 is a schematic block diagram illustrating a test automation system 100 generating a quality assessment report table 308 in response to retrieved test-related data, in accordance with an embodiment.

The test automation system 100 can process a collection of test scripts, for example, regression test scripts, provided from a test automation repository 302 in communication with the test automation system 100. In particular, the test scripts can be written by test engineers and executed by a test tool such as RFT to validate the functionality of a software program 340. The test automation system 100 can also communicate with one or more quality management tools 304, such as an RQM server, which can manage the software being developed and tested by providing test planning, workflow control, tracking, metrics reporting, and the like. For example, RQM can manage software requirements, line items, provide storyboard testing, and the like, and manage the relationship of test artifacts, e.g., T1, T2, T3, to these line items, storyboards, etc. Thus, a software tester can edit test scripts by acting against screen shots of an application under test, etc.

The test automation system 100 can monitor what is being tested, and collect and record what is being tested along with the test results and other related test data from the quality management tool 304, the test automation result history database 306, and/or from an output of the test automation engine module 104, for example, an analysis of an automation test run. For example, the test automation system 100 can utilize the existing test artifacts T1, T2, T3 corresponding to the software program under test 340. Information can be collected about what those test artifacts are doing. The test automation system 100 can process this information, along with other test result data, to rate the overall quality of a software product based on those tests and results.

The test automation system 100 can also communicate with a test automation result history database 306, which can include historic test run information or related information for use in statistical analysis, trends, and the like. Data from the database 306 can be applied in comparisons with data generated from a current automated test run, for example, which code paths are being exercised by a particular test, which platforms are exercised by the test, and other details that can be observed by the automation infrastructure. These details can include what type of test has been run, for example, a boundary conditions test, a stress test, a GUI test, an http protocol test, a SOAP protocol test, a test of command line functions, and the like.

The test automation system 100 can record results of tests being monitored and/or other related information in the quality assessment report table 308. The quality assessment report table 308 can present information about what kinds of tests passed and failed, and what those tests were doing. For example, the quality assessment report table 308 can provide data about what areas of the product are well tested and functioning properly, what areas of the product are well tested and not functioning properly, what areas of the product have not been tested, and the like.

The quality assessment report table 308 can be organized into columns. A first column 310 can include a set of test identifiers T1, T2, T3, each corresponding to an executed test. A second column 312 can include a set of steps performed during a test run. For example, test T1 is shown to have three steps 1, 2, 3. A third column 314 can include a test result of each performed test step. The test result can be output by the test automation system 100, for example, the test outcome analyzer module 106 shown in FIG. 1. A fourth column 316 can include a set of product components that are associated with aspects of the executed tests. The product component information can be determined from a quality management tool, e.g., RQM. Alternatively, the test automation engine module 104 can detect the component in use during a given test. For example, the test automation engine module 104 can receive code coverage analysis data, for example, from a Rational Pure Coverage tool, to determine the degree to which the source code of the program under test 340 has been tested. For example, a determination can be made that 90% of the code exercised in a particular test is in the "Single Sign On" product component of the program under test 340. A stack trace, for example, a NullPointerException, could also be used to determine more information about a test, or issues found by the test. Accordingly, the test automation system 100 can process static data about a test, as well as data determined by the test automation engine module 104 without the need for a test engineer to provide that information manually. A fifth column 318 can include types of tests corresponding to the test identifier shown in the first column 310.

A sixth column 320 can include a regression result, which identifies that a test is failing now, but the test previously passed. The regression result can be determined based on a comparison between one or more test results of a particular component of the product under test 340 and one or more previous test results to indicate whether a test failure is a regression. A seventh column 322 can include operating system types under which the corresponding test T1, T2, T3 was run. An eighth column 324 can include a set of relative performance indicators, which can be calculated by the test automation system 100 by comparing the performance of the current test and the historic test runs, for example, retrieved from the test automation result history database 306. Thus, the relative performance column could indicate a period of time required to execute the test as compared to a historical average.

As shown in the quality assessment report table 308, test T1 includes steps 1, 2, and 3. Test T1 was performed on a platform running an AIX operating system. In step 1, a performance test was performed on a database query engine component of the program under test 340. In step 2, a boundary conditions test was performed on the database query engine component of the program under test 340. In step 3, a security login test was performed on a single sign on component of the program under test 340. There were no regressions found during the execution of Test T1, that is, no tests failed in Test T1 that previously were passing. Relative performance of the components of the program under test, more specifically, the database query engine and the single sign on components, was determined to be normal or expected. Relative performance shown in column 324 can be calculated by the test automation system 100 by comparing the performance of the current test versus historic test runs. For example, at grid cell 330, step 1 of test T3 is shown to be 500% slower than historic averages. Thus, even though step 1 of test T3 is identified as passing, as shown at grid cell 332, this test indicates that the product may have a performance problem, even though the basic functionality is working. Furthermore, quality assessment report table 308 also indicates that the test automation system 100 observed that step 2 of test T3 ran a similar test, i.e., a GUI client test, but was executed on a different operating system, AIX 336, instead of Windows 334 under which step 1 of test T3 was performed. A user can therefore determine from the quality assessment report table 308 that there is a recently introduced platform dependent performance issue, and that the Windows operating system is the affected platform.

Figure 4:
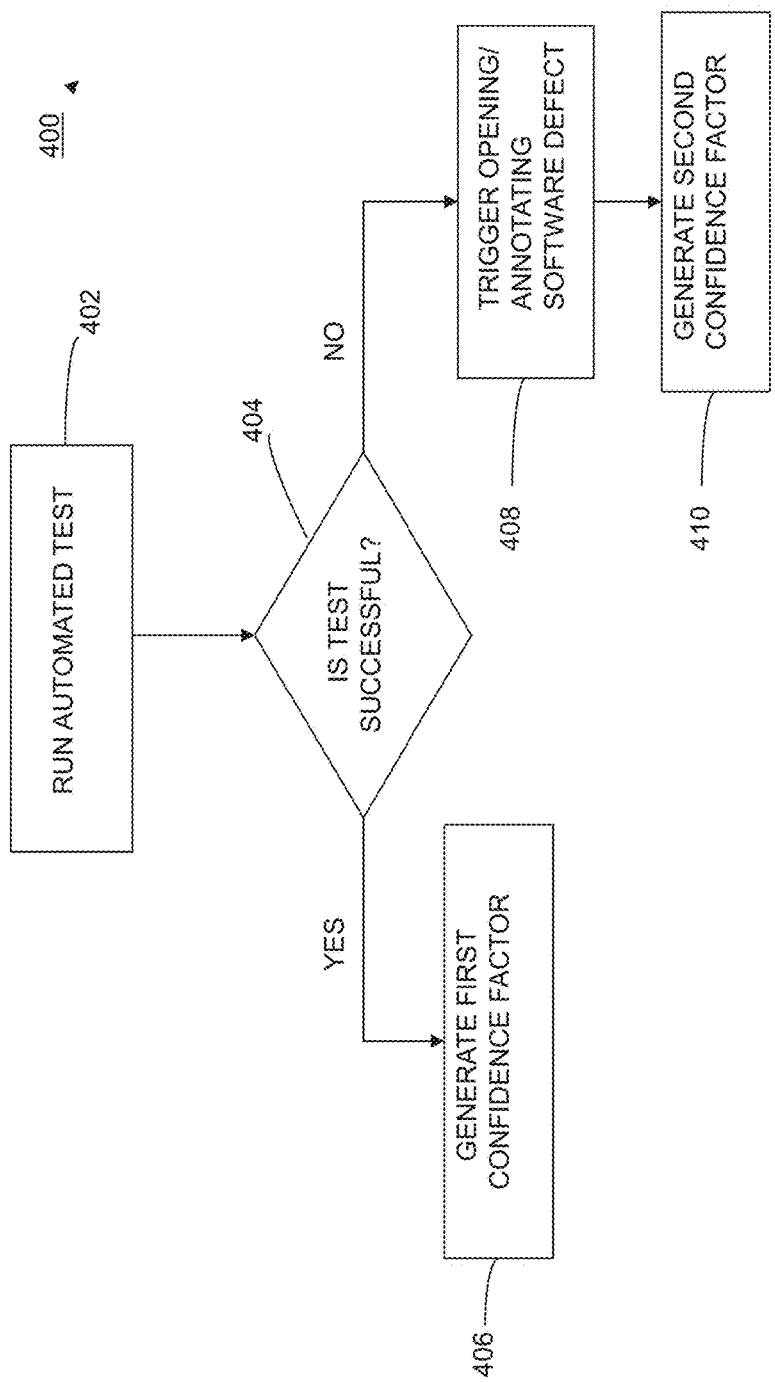
FIG. 4 is flowchart of a method for assessing product quality from a test result, in accordance with an embodiment.

FIG. 4 is flowchart illustrating a method 400 for assessing product quality from a test result, in accordance with an embodiment. Some or all of the method 400 can be performed on a computer system comprising at least a processor, a memory, and the test automation system 100.

At block 402, an automated test can be performed on a program under test. Details of the executed automated test can be similar to those described at block 202, and will not be repeated for reasons related to brevity.

At decision block 404, a determination can be made as to whether the test is successful. A test can be determined to be successful when a pass test result is generated indicating that the operation requested by the test is completed successfully. In this case, at block 406, a first confidence factor can be generated, which can indicate that the test success increases a confidence interval for aspects of the system exercised by the test. For example, the quality assessment report table 308 illustrates that steps 1-3 of Test T1 shown in FIG. 3 each passed. A confidence factor can also be provided that assesses the quality of the program under test 340 in view of the test T1 results. The confidence factor can be numerical value or other indicator of a confidence level in the aspects of the system exercised by the test. Accordingly, a confidence factor can be provided for each aspect, or portion, of a software product considered to be robust, or otherwise possesses sufficient integrity.

On the other hand, a test can be determined to be unsuccessful, for example, when a fail test result is generated. In this case, at block 408, a failure can trigger an automatic opening or annotation of a software defect for the failure based on the information made available to the test automation system 100. For example, the quality assessment report table 308 at grid cell 326 illustrates that step 1 of Test T2 shown in FIG. 3 failed. In another example, grid cell 330 indicates that step 1 of Test T3 passed, but uncovered a performance problem. Even though Test T3 passed, Test T3, step 1 can be deemed unsuccessful due to the performance problem, generating a "No" at decision block 404.

Several different options can be available if a failure is determined for a test. If no existing defects are found, a new defect can be opened. Alternatively, the test's "approval record" can be rejected in lieu of opening a new defect. If a duplicate defect is discovered by the test automation system 100, for example, from an information source such as the test automation result history database 306, then the defect can be annotated, for example, with a comment referring to the defect being discovered again.

At block 410, a second confidence factor can be generated, which can indicate that the test failure describes a confidence interval for aspects of the system exercised by the test. With each test failure, the system has more evidence that a software component is not working well, thus lowering the confidence in the component exercised by that test. In another example, a tester can perform testing on a new cell phone, whereby each time a successful call is made with the cell phone, a user's confidence that the phone works increases. If one failure out of 1000 is determined, it may lower the user's confidence slightly in the phone. If the user experiences many failures, for example, a 95% failure rate, the user's confidence in the phone will likely drop to a very low confidence level.

The quality assessment report table 308 also shows that steps 1 and 2 of Test 3 each passed, indicating that the operation requested by the test completed successfully. However, quality assessment report table 308 at grid cell 330 reveals a performance problem. In these cases, the test could cause a "test successful" answer of "No" in the following diagram.

Accordingly, FIG. 4 illustrates the assessment of product quality by using test automation results to know what parts of the product are working well and which are not, and which parts of the product are well tested and which are not.

Accordingly, our invention can automatically open the defect in the first place with the correct classification by using contextual clues that can be observed by the automation engine. For instance, the automation engine may notice that boundary cases fail but non-boundary cases pass. Or the automation engine may see that a test fails when the environment is under light load, but fails when the environment is under heavy load. This allows the automation engine to open a defect automatically with the appropriate wording and classification.

Figure 5:
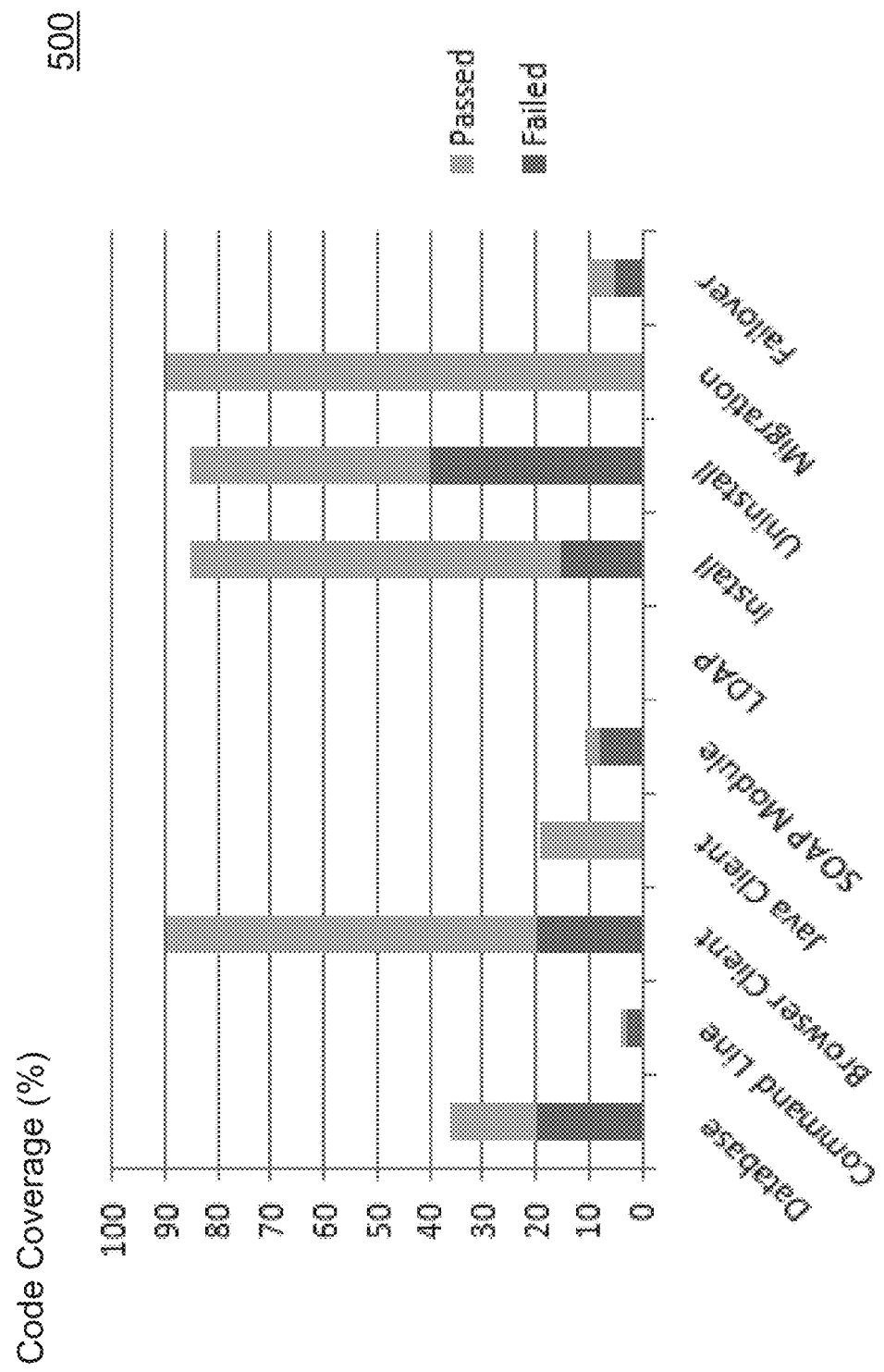
FIG. 5 is a graph illustrating code coverage results, in accordance with an embodiment.

FIG. 5 is a graph 500 illustrating code coverage results, in accordance with an embodiment. The graph 500 can be generated from a quality assessment produced by the test automation system 100. Graph 500 can indicate a percentage of code coverage for a set of components, e.g., database, command line, etc., of a program under test that is analyzed by the test automation system 100. For example, the "Browser Client" component indicates 90% code coverage, while the "LDAP" component indicates 0% coverage. Accordingly, a tester can conclude that there is a higher degree of certainty of the quality of the "Browser Client" component (90% code coverage), compared to that of the LDAP component (no code coverage).

The percentage of code coverage is further categorized into an amount of code coverage for successful tests (shown in light gray bars) and an amount of code coverage for failed tests (shown in dark gray bars). The boundaries for the components can be generated automatically or configured manually.

It is not always obvious to a third party or to an automated tool what the various components are in a software project. For example, there can be three aspects of a software program: 1) The graphical user interface, 2) a database access layer to store data and retrieve data to display on the GUI, and 3) some control logic between the GUI and the database access layer. A software engineer or tester can write the program in a single text file (source code). In this manner, when the code coverage tool runs, it will be difficult to determine which parts of the file are for the GUI (component 1), which parts are for the DB access layer (component 2) and which parts are the control logic between GUI and DB access layer (component 3). Typically such a software program would not be written in a single source code file because it would be harder to maintain that way. Typically, software engineers will divide the components and each component of the program would be in a separate source code file. This feature assists in separating the program into various source code files and simplifies the maintenance of the program. Also, a source code tracking tool can then provide more granularity about which source code files are exercised and which are not.

Examples of boundaries for generated components can include files x, y, and z pertaining to the GUI portion of the program, files a, b, and c pertaining to the Database Access layer of the program, and/or files d, e, f, and g pertaining to the control logic between GUI and DB layer. This identification of which parts of the source code apply to which components of the program could certainly be performed automatically by looking at the names of the files, or the directory structure in which the source code lives. For instance, the top level directory of the program may be called "MyProgram", and underneath that there may be three subdirectories "GUI", "DB", and "ControlLogic". The GUI code may all reside below the GUI subdirectory, and the code can be classified as one group. Thus, Java package names and the like can provide a natural division of components.

Accordingly, the test automation systems and methods can automatically discover information related to testing that is taking place for a program under test, and can correlate this with an automated test. The automatic analysis provided by the test automation system performing runtime execution can deliver data that permits a test to make a decision about product quality.

Accordingly, the test automation system 100 can perform a runtime discovery of test coverage. Test coverage can be tracked by techniques known to those of ordinary skill in the art, provided by the IBM Tivoli Composite Application Manager for Response Time. A correlation token can be associated with each automation test thread of execution. The correlation token can also be passed to child threads of the test, even on remote systems. Thus, when a code coverage tool detects coverage, for example, determines 90% coverage of a Browser Client shown in FIG. 5, this coverage data can be tagged with the correlation token. A parent/child relationship can be established with the correlation tokens, so that each time a new code coverage observation is made, a new child correlator is created for the parent, enabling a test to reconstruct an entire code path or call history corresponding to information analyzed by the test automation system 100.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A test automation system, comprising:
a special purpose computer that automatically determines first information related to a test of a software program in response to executing the test, the software program stored in a memory, the software program having a plurality of components that are tested independently of each other;
a special purpose computer that automatically collects second information related to the test;
a special purpose computer that produces a quality assessment after the test is run, the quality assessment including analysis data about the components relative to each other, wherein the quality assessment distinguishes a first result in a first test environment from a second result in a second test environment, wherein at least one of the first result and the second result includes a test result and a performance result, wherein the test result includes an indication of whether the test of the software program passes, wherein the performance result includes an indicator of a comparison between the test and historical test data regardless of whether the test result indicates that the software program passes; and
a special purpose computer that prevents a false positive reading of the first and second results by displaying both the performance results and the test results of the first and second results, and by comparing a performance of the test of the software program against the historical test data including pass/failure data about the test, and establishing that when the test result of the first result and the test result of the second result are the same result, the performance result of the first result is either the same as or different than the performance result of the second result depending on corresponding differences between the first test environment and the second test environment.

2. The test automation system of claim 1, wherein the first information includes a type of test performed on a particular component of the software program.

3. The test automation system of claim 2, wherein the first result is generated in response to the type of test performed on the particular component in the first test environment included in a first combination of the first and second information from a second result generated in response to the type of test performed on the particular component in the second test environment included in a second combination of the first and second information.

4. The test automation system of claim 2, wherein the particular component in the first test environment is part of a same software release as the particular component in the second test environment.

5. The test automation system of claim 2, further comprising a special purpose computer that generates a regression result, which identifies whether the test is failing now, but the test previously passed, by comparing the test result of the particular component and one or more previous tests to indicate whether a test failure is a regression, and wherein the regression result different than the test result and the performance result.

6. The test automation system of claim 1, further comprising a special purpose computer that generates a product quality table that displays an amount of code coverage for a component having the test result, and a percentage of the code coverage passing the test and a percentage of the code coverage failing the test, and that generates a correlation token associated with a thread of execution of the test, wherein the code coverage is tagged with the correlation token for reconstructing a code path of the component having the test result.

7. The test automation system of claim 1, further comprising a report generator that outputs the quality assessment to a display, including each of the test result and the performance result of each of the first and second results of the test preventing the attainment of the false positive reading.

8. The test automation system of claim 1, wherein the second information is received from a source other than the test automation system.

9. A test automation system, comprising:
a special purpose computer that automatically determines first information related to a test of a software program in response to executing the test, the software program stored in a memory, the software program having a plurality of components that are tested independently of each other;
a special purpose computer that automatically collects second information related to the test;
a special purpose computer that produces a quality assessment after the test is run, the quality assessment including analysis data about the components relative to each other, wherein the quality assessment distinguishes a first result in a first test environment from a second result in a second test environment, and wherein at least one of the first result and the second result includes a test result and a performance result;
a special purpose computer that generates a regression result, which identifies whether the test is failing now, but the test previously passed, by comparing the test result of the particular component and one or more previous tests to indicate whether a test failure is a regression, the regression result different than the test result and the performance result; and
a special purpose computer that prevents a false positive reading of the first and second results by displaying both the performance results and the test results of the first and second results, and by comparing a performance of the test of the software program against the historical test data including pass/failure data about the test, and establishing that when the test result of the first result and the test result of the second result are the same result, the performance result of the first result is either the same as or different than the performance result of the second result depending on corresponding differences between the first test environment and the second test environment, and wherein the performance result includes an indicator of a comparison between the test and historical test data regardless of whether the test result indicates that the software program passes.

10. The test automation system of claim 9, wherein the test result includes an indication of whether the test of the software program passes, and wherein the performance result includes an indicator of a comparison between the test and historical test data.

11. The test automation system of claim 9, further comprising a report generator that outputs the quality assessment to a display, including each of the test result and the performance result of each of the first and second results of the test preventing the attainment of the false positive reading.

12. The test automation system of claim 9, further comprising a special purpose computer that generates a product quality table that displays an amount of code coverage for a component having the test result, and a percentage of the code coverage passing the test and a percentage of the code coverage failing the test, and that generates a correlation token associated with a thread of execution of the test, wherein the code coverage is tagged with the correlation token for reconstructing a code path of the component having the test result.

13. A test automation system, comprising:
a special purpose computer that automatically determines first information related to a test of a software program in response to executing the test, the software program stored in a memory, the software program having a plurality of components that are tested independently of each other;
a special purpose computer that automatically collects second information related to the test; and
a special purpose computer that produces a quality assessment after the test is run, the quality assessment including analysis data about the components relative to each other, wherein the quality assessment distinguishes a first result in a first test environment from a second result in a second test environment, wherein at least one of the first result and the second result includes a test result and a performance result, wherein the test result includes an indication of whether the test of the software program passes, and a special purpose computer that generates a product quality table that displays an amount of code coverage for the component having the test result, and a percentage of the code coverage passing the test and a percentage of the code coverage failing the test, and that generates a correlation token associated with a thread of execution of the test, and wherein the code coverage is tagged with the correlation token for reconstructing a code path of the component having the test result; and
a special purpose computer that prevents a false positive reading of the first and second results by displaying both the performance results and the test results of both the first and second results, and by comparing a performance of the test of the software program against the historical test data including pass/failure data about the test, and establishing that when the test result of the first result and the test result of the second result are the same result, the performance result of the first result is either the same as or different than the performance result of the second result depending on corresponding differences between the first test environment and the second test environment.

14. The test automation system of claim 13, further comprising a report generator that outputs the quality assessment to a display, including each of the test result and the performance result of each of the first and second results of the test preventing the attainment of the false positive reading.

15. The test automation system of claim 13, further comprising a special purpose computer that generates a regression result, which identifies whether the test is failing now, but the test previously passed, by comparing the test result of s particular component of the software program and one or more previous tests to indicate whether a test failure is a regression, and wherein the regression result different than the test result and the performance result.

* * * * *